(12) United States Patent
Jaime et al.

(10) Patent No.: US 10,862,209 B2
(45) Date of Patent: Dec. 8, 2020

(54) ANTENNA TILT DRIVE

(71) Applicant: Huawei Technologies Co., Ltd., Shenzhen (CN)

(72) Inventors: Sven Jaime, Munich (DE); Bernhard Rist, Munich (DE); Christian Helbig, Munich (DE); Johann Baptist Obermaier, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 5 days.

(21) Appl. No.: 16/428,639

(22) Filed: May 31, 2019

(65) Prior Publication Data

US 2019/0288391 A1 Sep. 19, 2019

Related U.S. Application Data

(63) Continuation of application No. PCT/EP2016/079455, filed on Dec. 1, 2016.

(51) Int. Cl.
*H01Q 3/32* (2006.01)
*H01Q 1/24* (2006.01)
*H01Q 3/00* (2006.01)
*F03G 6/06* (2006.01)
*F03G 7/06* (2006.01)

(52) U.S. Cl.
CPC ............... *H01Q 3/32* (2013.01); *F03G 6/065* (2013.01); *H01Q 1/246* (2013.01); *H01Q 3/005* (2013.01); *F03G 7/065* (2013.01); *Y02E 10/46* (2013.01)

(58) Field of Classification Search
CPC ............ H01Q 3/32; H01Q 3/005; H01Q 3/06; H01Q 1/246
See application file for complete search history.

(56) References Cited

U.S. PATENT DOCUMENTS

| 6,198,458 B1 * | 3/2001 | Heinz | H01Q 1/125 343/757 |
| 6,603,436 B2 | 8/2003 | Heinz et al. | |
| 8,217,848 B2 * | 7/2012 | Girard | H01Q 3/32 343/766 |
| 2002/0135530 A1 | 9/2002 | Heinz et al. | |
| 2004/0178963 A1 | 9/2004 | Pawlenko et al. | |

(Continued)

FOREIGN PATENT DOCUMENTS

| CN | 1167545 A | 12/1997 |
| CN | 101855782 A | 10/2010 |

(Continued)

*Primary Examiner* — Hoang V Nguyen
(74) *Attorney, Agent, or Firm* — Leydig, Voit & Mayer, Ltd.

(57) ABSTRACT

An antenna including a remote electrical tilt drive for driving a movable phase shifter linkage is provided. The remote electrical tilt drive comprises a shape memory alloy arrangement attached to a non-moving part of the antenna and to the movable phase shifter linkage, wherein the shape memory alloy arrangement is configured to move the movable phase shifter linkage in a predetermined direction upon an electrical current being supplied to the shape memory alloy arrangement, and a counter motion member attached to the non-moving part of the antenna and to the movable phase shifter linkage and configured to move the movable phase shifter linkage in a direction opposite to the predetermined direction.

21 Claims, 8 Drawing Sheets

(56) References Cited

U.S. PATENT DOCUMENTS

2009/0069055 A1 3/2009 Linehan et al.
2016/0352011 A1* 12/2016 Duan ..................... H01Q 3/32

FOREIGN PATENT DOCUMENTS

| | | |
|---|---|---|
| CN | 103700944 A | 4/2014 |
| JP | S5944959 A | 3/1984 |
| JP | S61142980 A | 6/1986 |
| JP | H1039232 A | 2/1998 |
| JP | H10280764 A | 10/1998 |
| JP | 2005045545 A | 2/2005 |

* cited by examiner

ANTENNA TILT DRIVE

CROSS-REFERENCE TO RELATED APPLICATIONS

This application is a continuation of International Application No. PCT/EP2016/079455, filed on Dec. 1, 2016, the disclosure of which is hereby incorporated by reference in its entirety.

TECHNICAL FIELD

Embodiments of the invention relate to the field of antennas and, more particularly, to antennas provided with an electrical device for an adjustment of an angle or a down tilt of a signal of the antenna.

BACKGROUND

An angle or a down tilt of signals of antennas is commonly to be adjusted. This can be performed by tilting the antenna itself or by electrically adjusting the angle or the down tilt of the signals without mechanically moving the antenna on a mast or adjusting brackets. The electrical adjustment is performed by changing the phase of individual signals by phase shifters. A phase shifter typically comprises a housing accommodating electrical conductors and dielectrics by means of which the phase is shifted or movable electrical conductors to adjust the phase. The phase shifter further comprises a movable phase shifter linkage for introducing a movement into the phase shifter, wherein the movement about a defined amount results in a phase shifting via the above-mentioned components.

The linear movement introduced into the phase shifter is commonly done by a remote electrical tilt drive typically including several DC motors as well as a gear box and a carrier structure via the movable phase shifter linkage. The gear box transforms the rotational motion of the DC motors into a movement which is transmitted to the movable phase shifter linkage by the carrier structure. Therefore, the structure of the remote electrical tilt drive is complex and it includes a lot of components so that it is large. Due to its size, the remote electrical tilt drive is disposed at the bottom of the antenna where it increases the thickness of a frame or of a housing of the antenna. This leads to bigger wind loads, more weight and also higher costs.

Furthermore, due to the use of the DC motors inside the antenna housing, the motors and the corresponding electronics generate passive intermodulation. Therefore, a sophisticated shielding casing is necessary. Moreover, due to harsh outdoor environment conditions, the lifetime of the motors and of the electronics is limited.

SUMMARY

It is therefore an object of the present invention to remedy the above-mentioned disadvantages and to provide an improved concept for phase shifting in an antenna.

The object is achieved by the features of the independent claim. Further developments of the invention are apparent from the dependent claims, the description and the figures.

According to an aspect, an antenna includes a remote electrical tilt drive for driving a movable phase shifter linkage (e.g. of a phase shifter of the antenna). The remote electrical tilt drive comprises a shape memory alloy arrangement attached to a non-moving part of the antenna and to the movable phase shifter linkage. The shape memory alloy arrangement is configured to move the movable phase shifter linkage in a predetermined direction upon energy being supplied to the shape memory alloy arrangement. Furthermore, the remote electrical tilt drive comprises a counter motion member attached to the non-moving part of the antenna and to the movable phase shifter linkage and configured to move the movable phase shifter linkage in a direction opposite to the predetermined direction. The applying of energy to the shape memory alloy arrangement can for example be performed by supplying an electrical current to the shape memory alloy arrangement or by applying heat to the shape memory alloy arrangement or a combination of both.

Due to the use of a shape memory alloy arrangement configured in such manner, there is no need for an electric motor providing a rotary motion and for a gear box transforming the rotary motion of the motor into the linear motion driving the phase shifter linkage so that a simple and reliable structure can be achieved.

The non-moving characteristic of the non-moving part of the antenna means that the non-moving part has a stationary position with respect to the remote electrical tilt drive. The non-moving part can be a part of the antenna or a part of the remote electrical tilt drive or of another component of the antenna. Furthermore, it can be a single piece or multiple components being immovable with respect to the remote electrical tilt drive.

According to a first implementation of the antenna according to the aspect, a shape memory alloy arrangement end portion of the shape memory alloy arrangement is attached to the non-moving part of the antenna and another shape memory alloy arrangement end portion of the shape memory alloy arrangement is attached to the movable phase shifter linkage.

By attaching one of the shape memory alloy arrangement end portions to the non-moving part of the antenna and the other of the shape memory alloy arrangement end portions to the movable phase shifter linkage, a slim configuration of the remote electrical tilt drive is possible.

According to a second implementation of the antenna according to the first implementation, the antenna further comprises a fixed return support, fixed to the non-moving part of the antenna so that the fixed return support does not move with the phase shifter linkage, wherein the fixed return support is configured to redirect a portion of the shape memory alloy arrangement.

Due to the fixed return support, an increase of the length of the shape memory alloy arrangement beyond a distance between the attachment points of the shape memory alloy arrangement is possible. This is advantageous if a rate of length variation, e.g. an extension or compression rate caused by a current supply, in association with the length of the shape memory alloy arrangement is not sufficient for providing a sufficient stroke of the movable phase shifter linkage.

According to a third implementation of the antenna according to the first or second implementation, the antenna further comprises a flexible electric connector connected to the shape memory alloy arrangement end portion attached to the movable phase shifter linkage for supplying the energy in form of an electrical current to the shape memory alloy arrangement. The electrical resistance of the shape memory alloy arrangement leads to a voltage drop on the shape memory alloy arrangement thereby energizing the shape memory alloy arrangement.

One of the shape memory alloy arrangement end portions is attached to the movable phase shifter linkage. This end portion is supplied with electrical current by the flexible electric connector which can follow the movement of the movable phase shifter linkage so that the movement is enabled. In an alternative configuration, e.g., a conductor rail can be employed instead of the flexible electric connector.

According to a fourth implementation of the antenna according to the aspect, both shape memory alloy arrangement end portions of the shape memory alloy arrangement are fixed to the non-moving part, and a shape memory alloy arrangement section, preferably a middle section of the shape memory alloy arrangement, arranged between the shape memory alloy arrangement end portions is attached to the movable phase shifter linkage.

Due to the fixation of both shape memory alloy arrangement end portions to the non-moving part, no motion of any of the shape memory alloy arrangement end portions occurs so that the shape memory alloy arrangement end portions can be supplied with electrical current at fixed positions without moving connectors. This improves wear resistance of the connectors and, therefore, the lifetime of the antenna. Furthermore, due to this arrangement of the shape memory alloy arrangement, the force of the shape memory alloy arrangement can be increased in the sense of a parallel arrangement of the shape memory alloy arrangement.

According to a fifth implementation of the antenna according to the fourth implementation, the antenna further comprises a movable return support fixed to the movable phase shifter linkage so that the movable return support moves together with the phase shifter linkage, wherein the movable return support configured to redirect a portion of the shape memory alloy arrangement is further configured to connect the shape memory alloy arrangement section to the movable phase shifter linkage.

Since the movable return support is fixed to the movable phase shifter linkage, a balance of the lengths of portions of the shape memory alloy arrangement between the respective attachment point and the movable return support is possible.

According to a sixth implementation of the antenna according to the aspect or to anyone of the preceding implementations, the shape memory alloy arrangement is formed by a single shape memory alloy piece.

In case of using a single shape memory alloy piece, the structure of the remote electrical tilt drive is very simple to assemble and reduces the number of components.

According to a seventh implementation of the antenna according to the aspect, the shape memory alloy arrangement comprises, and preferably is formed by, a first shape memory alloy arrangement piece and a second shape memory alloy arrangement piece, wherein an end portion of the first shape memory alloy arrangement piece and an end portion of the second shape memory alloy arrangement piece are attached to the non-moving part and another end portion of the first shape memory alloy arrangement piece and another end portion of the second shape memory alloy arrangement piece are electrically conductively connected to one another by a non-shape memory alloy arrangement and to the movable phase shifter linkage at the location of the mutual connection.

Due to this configuration, the shape memory alloy arrangement can be supplied with electrical current at fixed positions of the end portions of the shape memory alloy arrangement pieces and the force of the shape memory alloy arrangement can be increased in the sense of a parallel arrangement of the shape memory alloy arrangement pieces.

According to an eighth implementation of the antenna according to the aspect or to anyone of the first to seventh implementation, a counter motion member end portion of the counter motion member is attached to the non-moving part of the antenna and another counter motion member end portion of the counter motion member is attached to the movable phase shifter linkage.

By attaching one of the counter motion member end portions to the non-moving part of the antenna and the other of the counter motion member end portions to the movable phase shifter, a slim configuration of the remote electrical tilt drive is possible.

According to a ninth implementation of the antenna according to the eighth implementation, a further fixed return support is fixed to the non-moving part of the antenna, wherein the further fixed return support is configured to redirect a portion of the counter motion member.

Due to the further fixed return support, an increase of the length of the counter motion member beyond the distance of the attachment points of the counter motion member is possible. This is advantageous if a rate of length variation, e.g. a spring rate or an extension or compression rate caused by a current supply, of the counter motion member is not sufficient for providing a sufficient stroke of the movable phase shifter linkage.

According to a tenth implementation of the antenna according to the aspect or to anyone of the first to seventh implementation, the counter motion member end portions are fixed to the non-moving part, and a counter motion member section, preferably a middle section of the counter motion member, provided between the counter motion member end portions is attached to the movable phase shifter linkage.

Due to this arrangement of the counter motion member, in the case of being an electrically controllable counter motion member, the counter motion member end portions can be supplied with electrical current at fixed positions without moving connectors. Furthermore, the force of the counter motion member can be increased in the sense of a parallel arrangement of counter motion member.

According to an eleventh implementation of the antenna according to the tenth implementation, the antenna further comprises a further movable return support fixed to the movable phase shifter linkage, wherein the further movable return support is configured to redirect a portion of the counter motion member.

Since the further movable return support is fixed to the movable phase shifter linkage, a balance of the lengths of portions of the counter motion member between the respective attachment point and the movable return support is possible.

According to a twelfth implementation of the antenna according to the aspect or to anyone of the first to fifth implementation, the counter motion member is formed by a first counter motion member piece and a second counter motion member piece, wherein an end portion of the first counter motion member piece and an end portion of the second counter motion member piece are attached to the non-moving part and another end portion of first counter motion member piece and another end portion of the second counter motion member piece are connected to one another and to the movable phase shifter linkage. Alternatively, the counter motion member is formed by a single piece.

Due to this configuration of the counter motion member, the force of the counter motion member can be increased in the sense of a parallel arrangement of the counter motion member pieces and, moreover, in case of an electrically controllable counter motion member, it can be supplied with electrical current at fixed positions of the end portion of the counter motion member pieces.

According to a thirteenth implementation of the antenna according to the aspect or to anyone of the preceding implementations, the counter motion member comprises a mechanical spring.

By providing the counter motion member with a mechanical spring (in contrast to a non-mechanical shape memory alloy spring), a motion of the movable phase shifter linkage can be controlled by merely controlling the shape memory alloy arrangement without the need of controlling the counter motion member. The movable phase shifter linkage moves when the shape memory alloy arrangement is supplied with electrical current and a force of the shape memory alloy arrangement exceeds the force of the spring and returns when the shape memory alloy arrangement is deenergized and the force of the shape memory alloy arrangement becomes lower than the force of the spring. The counter motion member can be provided with a single spring or, alternatively, with several springs (e.g. two springs) which, in a certain configuration, can be arranged in parallel.

According to a fourteenth implementation of the antenna according to the aspect or to anyone of the preceding implementations, the counter motion member is a further shape memory alloy arrangement, being configured to move the movable phase shifter linkage in an opposite direction to the predetermined direction upon energy (e.g. in form of an electrical current or heat or a combination of both) being supplied to the further shape memory alloy arrangement, i.e. the piece(s) of the counter motion member which produce the counter motion force are shape memory alloy arrangements.

By using a further shape memory alloy arrangement as the counter motion member so that this is electrically controllable, the movement in the predetermined direction as well as the motion opposite to the predetermined direction can be controlled by supplying the respective shape memory alloy arrangement with electrical current.

According to a fifteenth implementation of the antenna according to the aspect or to anyone of the preceding implementations, at least a portion of the shape memory alloy arrangement and/or of the further shape memory alloy arrangement has a shape of a coil spring.

A portion of the (further) shape memory alloy arrangement having the shape of a coil spring enables a configuration of this portion such that, according to a selection and an arrangement of a respective material, the coil spring extends when energized and maintains its present state when energization is stopped or the coil spring contracts when energized and maintains its present state when energization is stopped. Alternatively or additionally, the (further) shape memory alloy arrangement is formed by or comprises a straight wire portion which enables a slim configuration of the (further) shape memory alloy arrangement. When using the shape of a coil spring, a rate of length variation, e.g. an extension or compression rate caused by a current supply, is enhanced compared to a straight wire portion.

According to a sixteenth implementation of the antenna according to the aspect or to anyone of the preceding implementations, the remote electrical tilt drive further comprises a locking device configured to lock the movable phase shifter linkage.

The locking device ensures arresting of the movable phase shifter linkage at a predetermined position so that the movable phase shifter linkage is held immovably with respect to the antenna and the phase of the signal and therefore the electrical down tilt of the antenna does not change. Therefore, after adjustment of the position of the movable phase shifter linkage, no energization of the (further) shape memory alloy arrangement is necessary, in particular, no energization of the shape memory alloy arrangement is necessary in case of a counter motion member being a mechanical spring. Furthermore, long term stability can be ensured.

According to a seventeenth implementation of the antenna according to the aspect or to anyone of the preceding implementations, the antenna is provided with a positioning sensor configured to detect a position of the movable phase shifter linkage.

By the provision of the positioning sensor, a feedback control for adjusting the predetermined position of movable phase shifter linkage for enhancing the signal quality is possible.

According to an eighteenth implementation of the antenna according to the aspect or to anyone of the preceding implementations, the remote electrical tilt drive comprises a controller, wherein the controller is configured to receive a tilt adjust signal and to supply (e.g. in form of an electrical current or heat or a combination of both) to the shape memory arrangement so that the shape memory arrangement moves the phase shifter linkage into a predetermined position in dependence on the tilt adjust signal.

Due to the use of the appropriately configured controller, a tilt signal according to the predetermined position of the movable phase shifter linkage received by the controller can be converted into an electrical current value which causes the shape memory arrangement of the remote electrical tilt drive to move the phase shifter linkage into the predetermined position.

According to a nineteenth implementation of the antenna according to the eighteenth implementation, the controller is configured to determine a present position of the movable phase shifter linkage based on an electrical resistance of the shape memory alloy arrangement.

The electrical resistance of the shape memory alloy arrangement depends on the present state of the shape memory alloy arrangement, in particular on the length of the shape memory alloy arrangement. When knowing the electrical resistance, the respectively configured controller having stored exchange values or stored maps for converting the electrical resistance of the shape memory alloy arrangement into the length of the shape memory arrangement can determine the present position of the movable phase shifter linkage. Hence a positioning detector being a separate component is not necessary.

According to a twentieth implementation of the antenna according to the eighteenth or nineteenth implementation, the controller is configured to determine a present temperature in the antenna based on an electrical resistance of the shape memory alloy arrangement.

The electrical resistance of the shape memory alloy arrangement also depends on the present temperature in the antenna. When knowing the electrical resistance, the respectively configured controller having e.g. stored exchange values or stored tables for converting the electrical resistance of the shape memory alloy arrangement into the temperature in the antenna under consideration of the predetermined position can determine the present temperature in the antenna.

In other words, it is even possible to determine both—the position and the temperature-based on the electrical resistance of the shape memory alloy arrangement.

BRIEF DESCRIPTION OF THE DRAWINGS

In the following detailed portion of the present disclosure, the invention will be explained in more detail with reference to the exemplary embodiments shown in the drawings, in which.

Identical reference signs are used for identical or at least functionally equivalent features.

DETAILED DESCRIPTION OF EMBODIMENTS OF THE INVENTION

Figure 1:
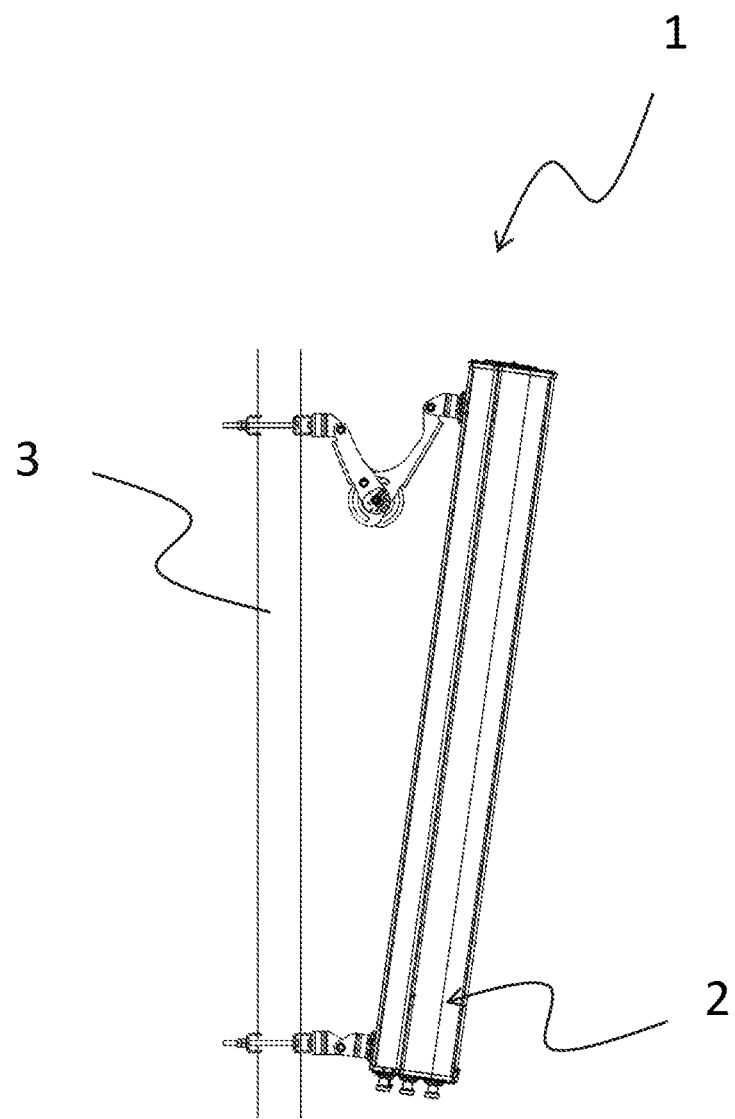
FIG. 1 shows a side view of an antenna according including a remote electrical tilt drive.

FIG. 1 shows a side view of a (base station) antenna 1 according to an embodiment of the present invention including a remote electrical tilt drive 2. In this example figure, the antenna 1 is mounted to a fixture device 3 in a predetermined level and is mechanically tiltable. Furthermore, the antenna 1 includes the remote electrical tilt drive 2 for changing the phase of individual signals for electrically adjusting an angle or a down tilt of signals of the antenna 1.

Figure 2:
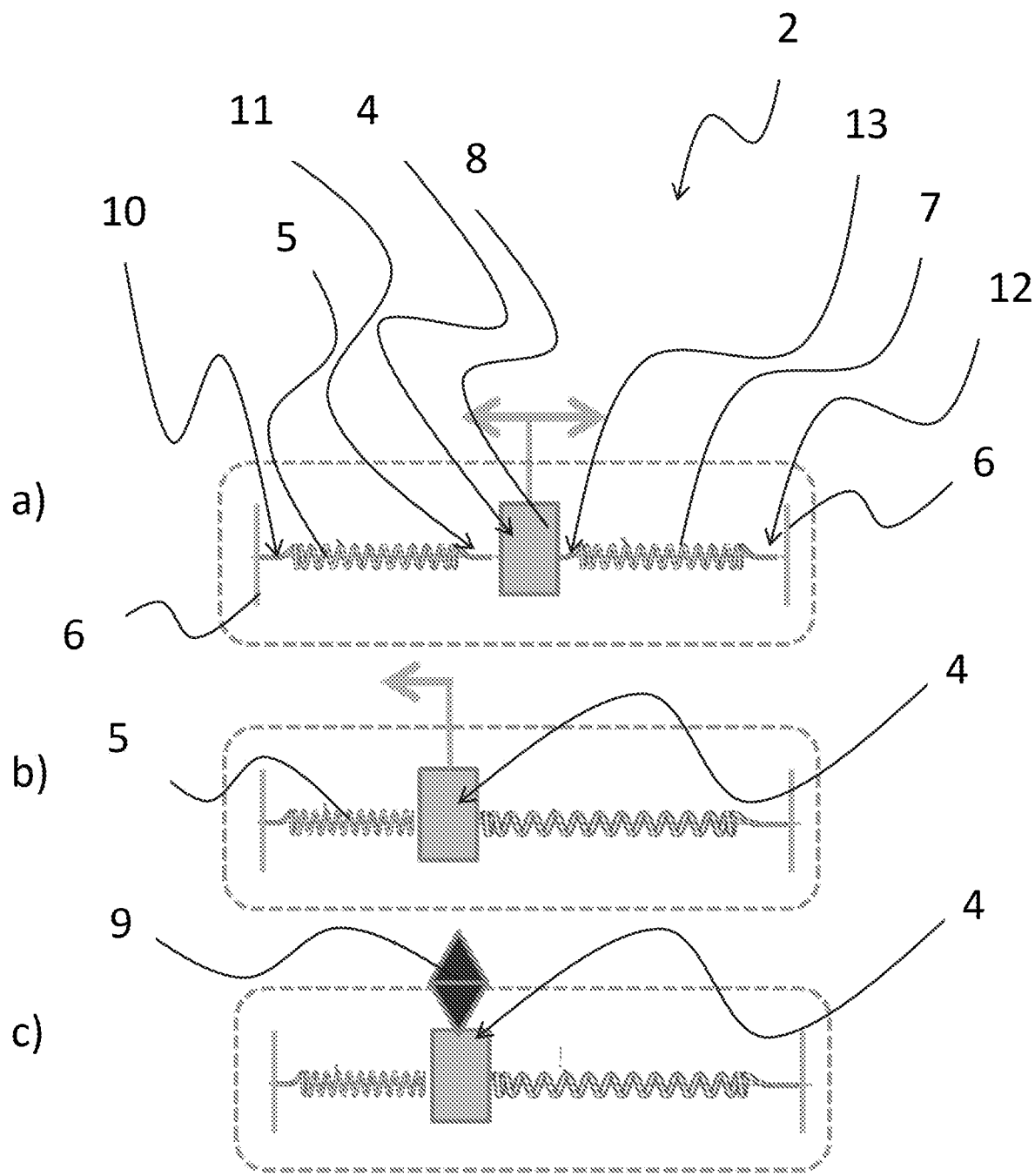
FIG. 2 shows a functional principle of the remote electrical tilt drive including a movable phase shifter linkage as used in embodiments of the present invention.

FIG. 2 shows a functional principle of the remote electrical tilt drive 2 including a movable phase shifter linkage 4. The remote electrical tilt drive 2 is configured to drive the movable phase shifter linkage 4. The remote electrical tilt drive 2 comprises a shape memory alloy arrangement 5 attached to a non-moving part 6 (e.g. a housing, reflector or frame) of the antenna 1 and to the movable phase shifter linkage 4, wherein the shape memory alloy arrangement 5 is configured to move the movable phase shifter linkage 4 (and therefore the phase shifter) in a predetermined direction upon an electrical current being supplied to the shape memory alloy arrangement 5, and a counter motion member 7 attached to the non-moving part 6 of the antenna 1 and to the movable phase shifter linkage 4, wherein the counter motion member 7 is configured to move the movable phase shifter linkage 4 in a direction opposite to the predetermined direction.

Optionally, the remote electrical tilt drive 2 further comprises a locking device 9 configured to lock the movable phase shifter linkage 4.

Part a) of FIG. 2 shows a principle configuration of the remote electrical tilt drive. Part b) of FIG. 2 shows the case when the shape memory alloy arrangement 5 is activated and the movable phase shifter linkage 4 is moved in the predetermined direction. In part c) of FIG. 2, the optional locking device 9 immovably locking the movable phase shifter linkage 4 is shown.

As shown in part a) of FIG. 2, the shape memory alloy arrangement end portion 10 of the shape memory alloy arrangement 5 is attached to the non-moving part 6 of the antenna 1 and another shape memory alloy arrangement end portion 11 of the shape memory alloy arrangement 5 is attached to the movable phase shifter linkage 4. Furthermore, a counter motion member end portion 12 of the counter motion member 7 is attached to the non-moving part 6 of the antenna 1 and another counter motion member end portion 13 of the counter motion member 7 is attached to the movable phase shifter linkage 4.

In the following, different implementations for the remote electrical tilt drive 2 will presented which can all be implemented in antennas according to embodiments of the present invention. All these implementations have in common that they comprise at least one shape memory alloy arrangement and a counter motion member, connected to a movable phase shifter linkage of the phase shifter of the antenna. Thereby, all these implementations achieve a slim and cost efficient remote electrical tilt drive.

Figure 3:
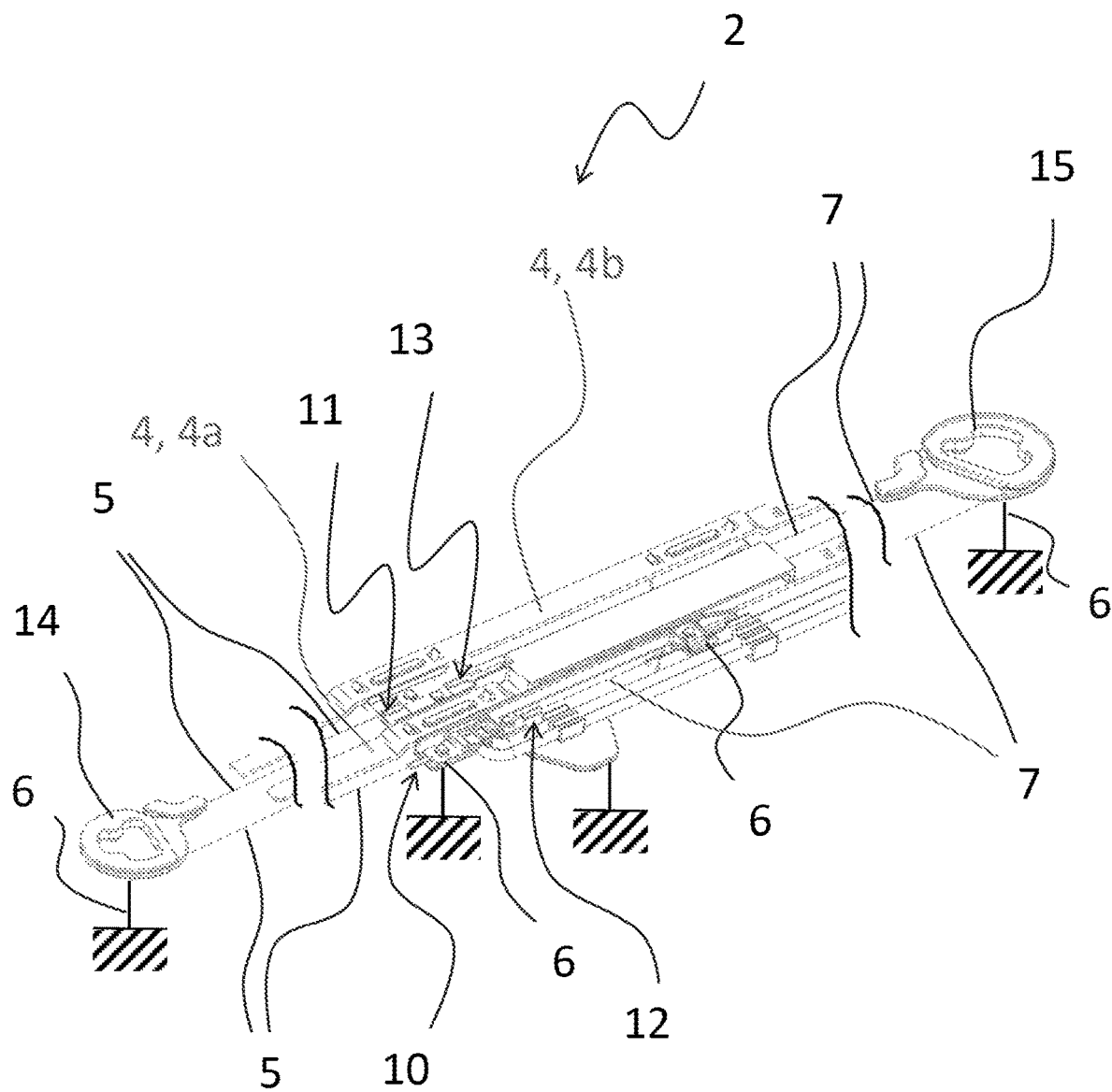
FIG. 3 shows a first possible implementation of the remote electrical tilt drive as can be used in embodiments of the present invention.

FIG. 3 shows a first possible implementation of the remote electrical tilt drive 2 as used in embodiments of the present invention, such as antenna 1. The shape memory alloy arrangement 5 is attached to the non-moving part 6 of the antenna 1 and to the movable phase shifter linkage 4. The shape memory alloy arrangement 5 is configured to move the movable phase shifter linkage 4 in the predetermined direction upon an electrical current being supplied to the shape memory alloy arrangement 5. Furthermore, a counter motion member 7 is attached to the non-moving part 6 of the antenna 1 and to the movable phase shifter linkage 4 and is configured to move the movable phase shifter linkage 4 in a direction opposite to the predetermined direction. In the example shown in FIG. 3, the phase shifter linkage 4 is composed from two parts 4a and 4b both connected to the shape memory alloy arrangement 5 and the counter motion member 7. In another embodiment one part maybe sufficient. Furthermore, in the example shown in FIG. 3 the shape memory alloy arrangement 5 is formed by a single shape memory alloy piece (e.g. a single wire).

As already depicted in FIG. 2, also in FIG. 3, a shape memory alloy arrangement end portion 10 of the shape memory alloy arrangement 5 is attached to the non-moving part 6 of the antenna 1 and another shape memory alloy arrangement end portion 11 of the shape memory alloy arrangement 5 is attached to the movable phase shifter linkage 4. Furthermore, a counter motion member end portion 12 of the counter motion member 7 is attached to the non-moving part 6 of the antenna 1 and another counter motion member end portion 13 of the counter motion member 7 is attached to the movable phase shifter linkage 4.

Furthermore, in this example, the counter motion member 7 is a further shape memory alloy arrangement which is configured to move the movable phase shifter linkage 4 in an opposite direction to the predetermined direction upon an electrical current being supplied to the further shape memory alloy arrangement. In other words, the piece(s) of the counter motion member 7 which produce the counter motion force are also shape memory alloy arrangement(s). In this example the shape memory alloy arrangement 5 and the counter motion member 7 are even implemented by one single shape memory alloy wire. The opposite energizing states (different voltages applied to the shape memory alloy arrangement 5 and the counter motion member 7) are in the example achieved by applying one of the potentials at a middle section of the shape memory alloy wire at the movable phase shifter linkage 4. In other words, the two ends of the shape memory alloy arrangement 5 and the counter motion member 7 are connected to each other and supplied with a certain potential at the movable phase shifter linkage 4. In further embodiments, two separate shape metal alloy wires could be used for the shape memory alloy arrangement 5 and the counter motion member 7.

A fixed return support 14 is fixed to the non-moving part 6 of the antenna 1 so that the fixed return support 14 does not move with the phase shifter linkage 4. The fixed return support 14 is configured to redirect a portion of the shape memory alloy arrangement 5.

Furthermore, a further fixed return support 15 is fixed to the non-moving part 6 of the antenna 1. The further fixed return support 15 is configured to redirect a portion of the counter motion member 7.

The shape memory alloy arrangement and the further shape memory alloy arrangement are formed by wire(s) having a diameter of 0.2 to 0.35 mm and a respective total length of 1400 mm. However, the wires can alternatively also have other dimensions. When activated, the force of the wire is about 30 N. The maximal length variation is 3-4% of the original length. In an alternative configuration, also other length variation rates are possible. Both ends of the wire are crimped to provide a mechanical as well as an electrical connection. Alternatively, other fixing methods are conceivable.

It shall be mentioned again, that in this example, the shape memory alloy arrangement 5 and the further shape memory alloy arrangement 7 are formed by one single continuous wire. Hence, the shape memory alloy arrangement end portion 11 and the counter motion member end portion 13 are connected so as to form the single wire. However, in an alternative implementation, the shape memory alloy arrangement and the further shape memory alloy arrangement can be formed by two separated wires.

The fixed return supports 14, 15 are fixed in a non-rotatable manner. It is advantageous to choose the minimum radius of the fixed return supports 14, 15 about 50-100 times of the wire diameter to avoid mechanical stresses and fatigue. In order to reduce the friction between the fixed return supports and the shape memory alloy arrangement, the fixed return supports 14, 15 can be configured as to be rotatable and/or the fixed return supports 14, 15 can at least partially be made of ceramic.

Figure 4:
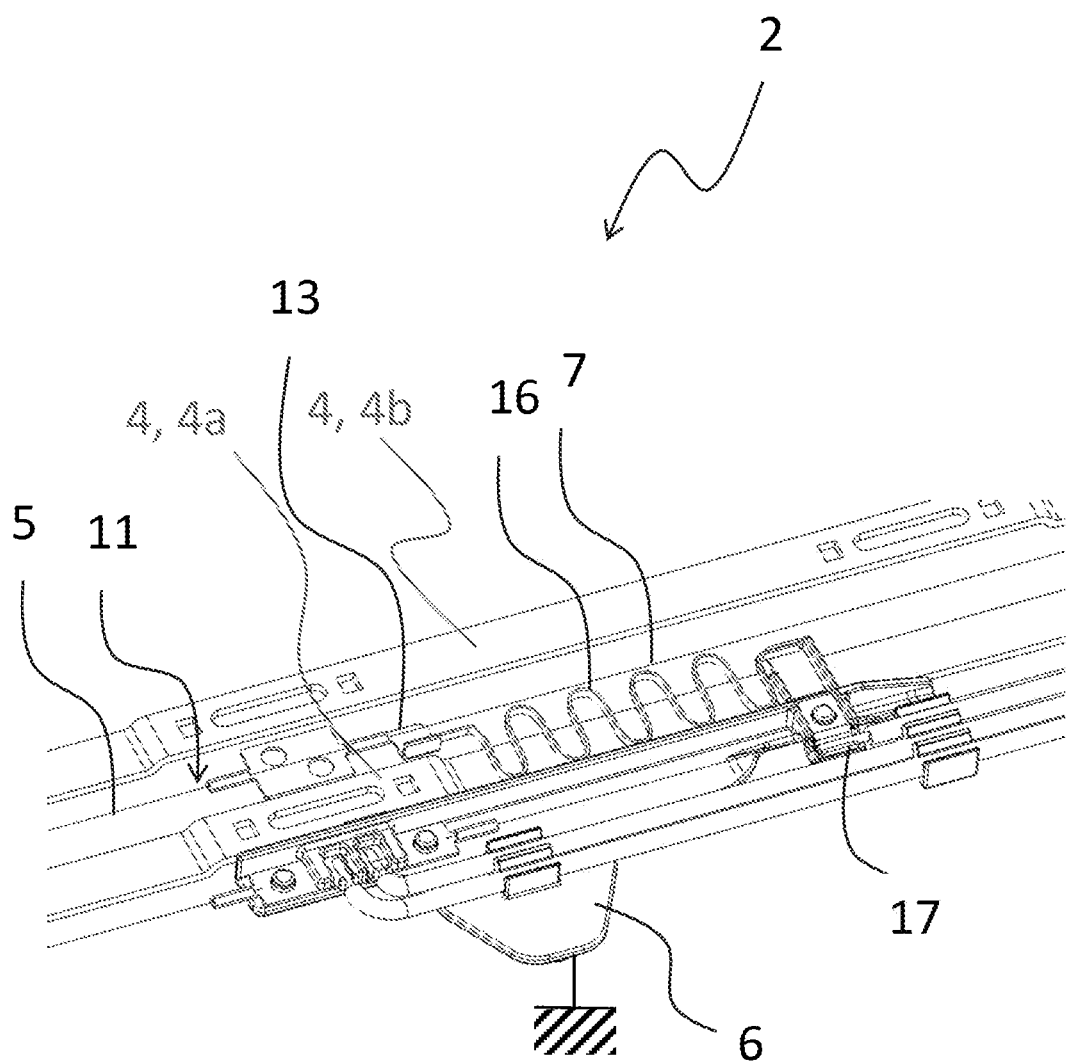
FIG. 4 shows in more detail a flexible electric connector used in the remote electrical tilt drive from FIG. 3.

FIG. 4 illustrates the use of a flexible electric connector 16 in the first implementation of the remote electrical tilt drive 2. The flexible electric connector 16 is connected to the shape memory alloy arrangement end portion 11 attached to the movable phase shifter linkage 4, composed by two elements 4a and 4b, for supplying the electrical current to the shape memory alloy arrangement 5 and also to the counter motion member end portion 13 for supplying the electrical current to the further shape memory alloy arrangement 7. The flexible electric connector 16 is also connected to a non-moving terminal 17 attached to the non-moving part 6 for supplying the electrical current to the flexible connector 16 itself. From FIG. 4 it is apparent, that if the movable phase shifter linkage 4 moves, also the electric connector 16 is extends or shrinks in length so as to always provide an electric potential to the counter motion member end portion 13 and the memory alloy arrangement end portion 11.

Figure 5:
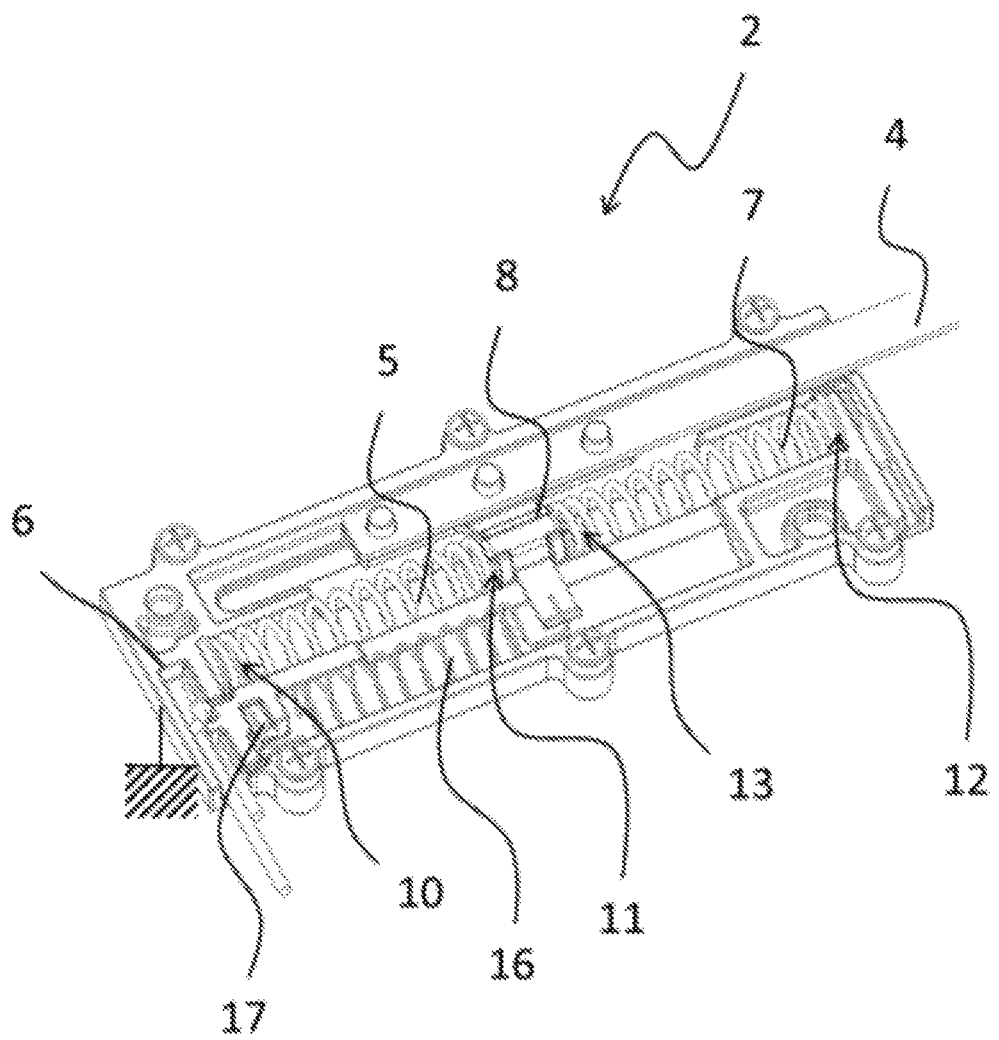
FIG. 5 shows a second possible implementation of the remote electrical tilt drive as can be used in embodiments of the present invention with two opposing shape memory alloy (SMA) arrangements and a flexible electrical connector.

FIG. 5 shows a second possible implementation of the remote electrical tilt drive as can be used in embodiments of the present invention with two opposing SMA arrangements 5, 7 and a flexible electrical connector 16. The shape memory alloy arrangement end portion 10 of the shape memory alloy arrangement 5 is attached to the non-moving part 6 and the other shape memory alloy arrangement end portion 11 of the shape memory alloy arrangement 5 is attached to the movable phase shifter linkage 4 via a piston 8. The counter motion member 7 is formed by the further shape memory alloy arrangement 7. The counter motion member end portion 12 of the counter motion member 7 is attached to the non-moving part 6 and the other counter motion member end portion 13 of the counter motion member 7 is attached to the movable phase shifter linkage 4 via the piston 8. The shape memory alloy arrangement 5 and the counter motion member 7 respectively have the shape of a coil spring and respectively work as a pressure spring which means that they become longer when energized. The flexible electric connector 16 is connected with a first end to the shape memory alloy arrangement end portion 11 of the shape memory alloy arrangement 5 and to the other counter motion member end portion 13 of the counter motion member 7 (further shape memory alloy arrangement) at piston 8. Furthermore, a second end of the flexible connector 16 is also connected to the non-moving terminal 17 attached to the non-moving part 6 for supplying the electrical current to the shape memory alloy arrangement 5 and to the counter motion member 7. As can be seen from FIG. 5, upon a movement of the piston 8 also the movable phase shifter linkage 4 moves and the flexible connector 16 shrinks or extends. The flexible electric connector 16 is in the example formed as a spring with a minimum spring force and it is isolated in an electric connector housing, in particular, a plastic housing.

Figure 6:
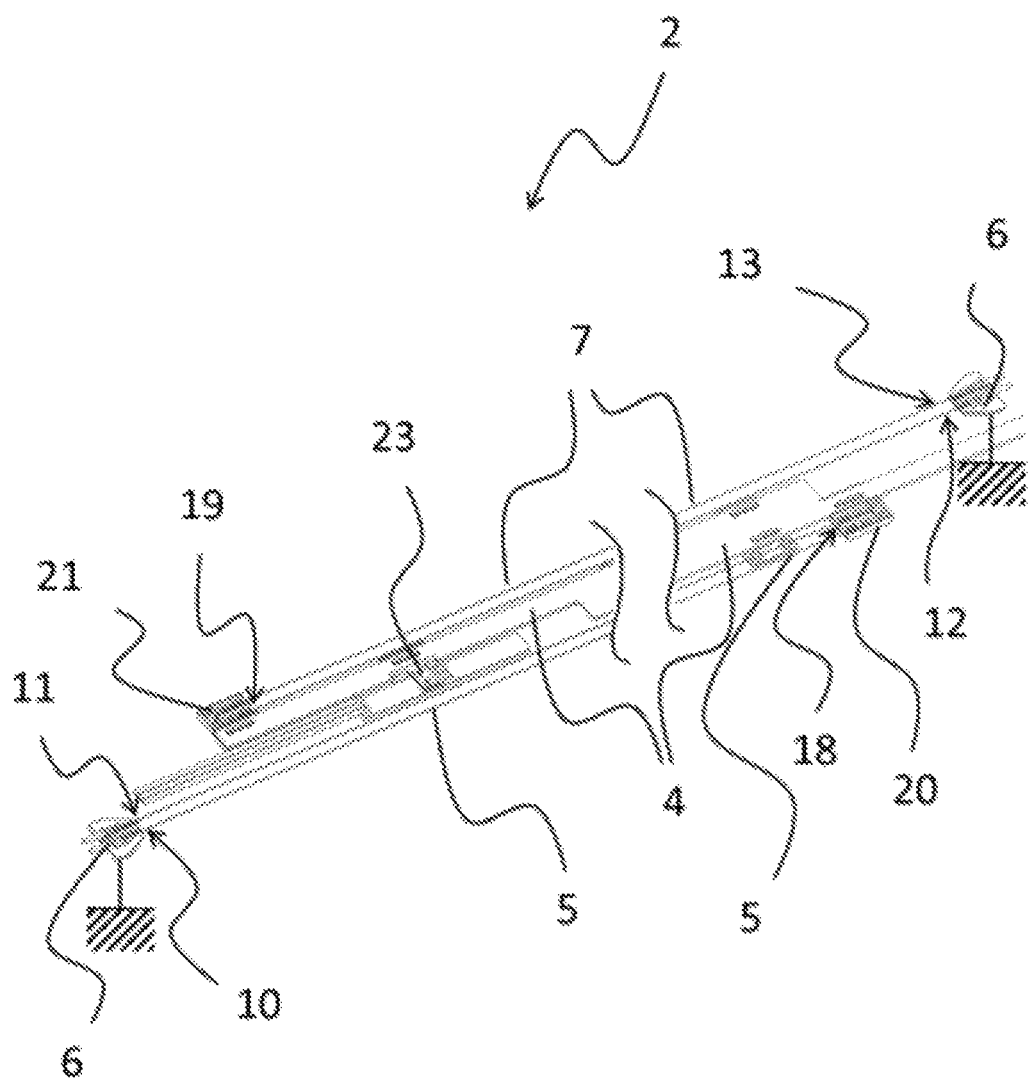
FIG. 6 shows a third possible implementation of the remote electrical tilt drive as can be used in embodiments of the present invention.

FIG. 6 shows a third possible implementation of the remote electrical tilt drive 2. Also in this configuration, the shape memory alloy arrangement 5 is attached to the non-moving part 6 of the antenna 1 and to the movable phase shifter linkage 4, wherein the shape memory alloy arrangement 5 is configured to move the movable phase shifter linkage 4 in the predetermined direction upon an electrical current being supplied to the shape memory alloy arrangement 5, and the counter motion member 7 is attached to the non-moving part 6 of the antenna 1 and to the movable phase shifter linkage 4 and is configured to move the movable phase shifter linkage 4 in a direction opposite to the predetermined direction. The shape memory alloy arrangement 5 is formed by a single shape memory alloy piece.

In this configuration, both shape memory alloy arrangement end portions 10, 11 of the shape memory alloy arrangement 5 are fixed to the non-moving part 6 and a shape memory alloy arrangement section 18, preferably a middle section of the shape memory alloy arrangement 5, arranged between the shape memory alloy arrangement end portions 10, 11 is attached to the movable phase shifter linkage 4.

Furthermore, the counter motion member end portions 12, 13 are fixed to the non-moving part 6 and a counter motion member section 19, preferably a middle section of the counter motion member, provided between the counter motion member end portions 12, 13 is attached to the movable phase shifter linkage 4.

Furthermore, the remote electrical tilt drive 2 comprises a movable return support 20 fixed to the movable phase shifter linkage 4 so that the movable return support 20 moves together with the phase shifter linkage 4. The movable return support 20 is further configured to redirect a portion of the shape memory alloy arrangement 5. Furthermore, the movable return support 20 is further configured to connect the shape memory alloy arrangement section 18 to the movable phase shifter linkage 4.

Further, the remote electrical tilt drive 2 comprises a further movable return support 21 fixed to the movable phase shifter linkage 4. The further movable return support 21 is configured to redirect a portion of the counter motion member 7 and is further configured to connect the counter motion member section 19 to the movable phase shifter linkage 4.

Also in this configuration, the counter motion member 7 is a further shape memory alloy arrangement 7 which is configured to move the movable phase shifter linkage 4 in an opposite direction to the predetermined direction upon an electrical current being supplied to the further shape memory alloy arrangement. In other words, the piece(s) of the counter motion member which produce the counter motion force are shape memory alloy arrangement(s).

In contrast to the implementations presented before, in the third implementation the remote electrical tilt drive 2 does not comprises and does not need a flexible electric connector. In other words, in the third implementation shape memory alloy arrangements are supplied with electrical currents from not moving (fixed) connection points at their respective ends.

Figure 7:
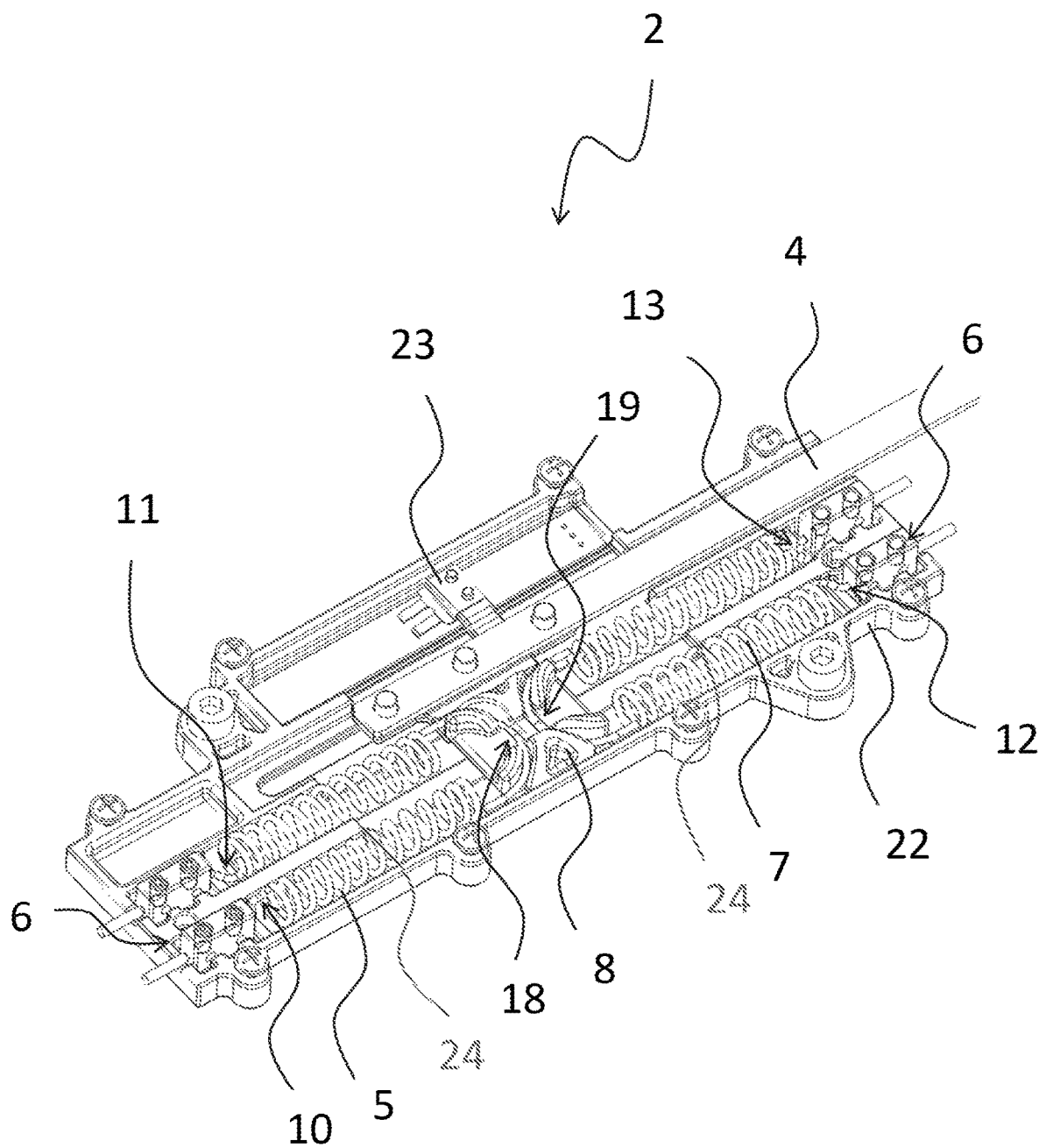
FIG. 7 shows a fourth possible implementation of the remote electrical tilt drive as can be used in embodiments of the present invention.

FIG. 7 shows a fourth implementation of the remote electrical tilt drive 2. The fourth implementation differs from the third implementation in the arrangement and the shape of the shape memory alloy arrangement 5 and of the counter motion member 7. The remaining principle structure and functions are similar to that of the first configuration.

At least a portion of the shape memory alloy arrangement 5 and at least a portion of the further shape memory alloy arrangement of the counter motion member 7 have a shape of a coil spring. The shape memory alloy arrangement 5 and the counter motion member 7 can be housed in a compact casing 22. The shape memory alloy arrangement end portions 10, 11 and the counter motion member end portions 12, 13 are attached within the casing 22 to the non-moving part 6. In an alternative embodiment, the counter motion member 7 is not formed by the further shape memory alloy arrangement but by (a) mechanical spring(s), made from spring steel for example.

Furthermore, the casing 22 can be provided with a cover (not shown). The cover is provided with holes to dissipate heat caused by activating the shape memory alloy arrangement.

The shape memory alloy arrangement section 18, in particular, a middle section of the shape memory alloy arrangement 5, arranged between the shape memory alloy arrangement end portions 10, 11 is attached to the movable phase shifter linkage 4 via the piston 8. Also, the counter motion member section 19, in particular, a middle section of the counter motion member 7, provided between the counter motion member end portions 12, 13 is attached to the movable phase shifter linkage 4 via the piston 8. Here, the sections 18, 19 are formed as half loops which are hooked into the piston 8.

The remote electrical tilt drive 2 further comprises at least one end stop 24 configured to limit a stroke of the movable phase shifter linkage 4. The end stop is provided by the non-moving part 6 to protect dielectrics, which may be part of the distribution network of the antenna 1, from any collision and mechanical damage. The distribution network provides the distribution of the electrical signals to the radiating elements controlling performance relevant parameters like individual signal amplitudes and signal phases. The figure shows end stops 24 for both the predetermined direction and the direction opposite to the predetermined direction. Alternative configurations of end stops are possible. The casing 22 is further provided with a positioning pin to define the position of the remote electrical tilt drive 2 with respect to the antenna housing.

Furthermore, as can be seen in FIGS. 6 and 7 the antenna 1 can be provided with a positioning sensor 23 (e.g. as part of the remote electrical tilt drive 2 or separated from it) configured to detect a position of the movable phase shifter linkage 4. In particular, the positioning sensor 23 may be included in the casing 22.

Figure 8:
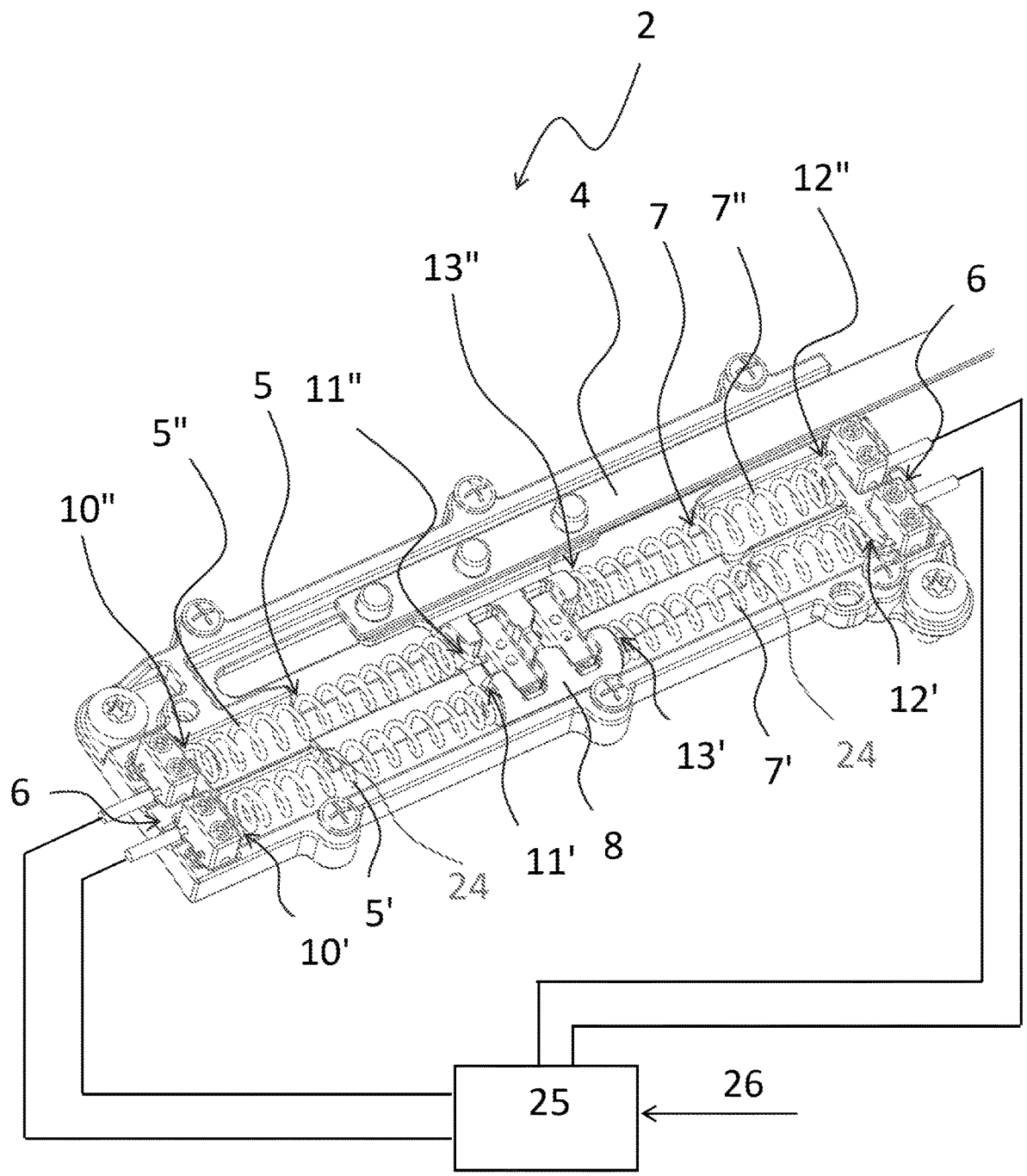
FIG. 8 shows a fifth possible implementation of the remote electrical tilt drive as can be used in embodiments of the present invention.

FIG. 8 shows a fifth implementation of the remote electrical tilt drive 2. The fifth implementation differs from the fourth implementation in the configuration of the shape memory alloy arrangement 5 and of the counter motion member 7. The remaining principle structure and functions are similar to that of the fourth configuration.

Contrary to the fourth implementation where the shape memory alloy arrangement 5 is formed as a single piece, in the fifth implementation, the shape memory alloy arrangement 5 comprises a first shape memory alloy arrangement piece 5' and a second shape memory alloy arrangement piece 5", wherein an end portion 10' of the first shape memory alloy arrangement piece 5' and an end portion 10" of the second shape memory alloy arrangement piece 5" are attached to the non-moving part 6 and another end portion 11' of the first shape memory alloy arrangement piece 5' and another end portion 11" of the second shape memory alloy arrangement piece 5" are electrically conductively connected to one another by a non-shape memory alloy arrangement and to the movable phase shifter linkage 4 at the location of the mutual connection.

Also contrary to the fourth implementation where the counter motion member 7 is formed as a single piece, in the fifth implementation, the counter motion member 7 is formed by a first counter motion member piece 7' and a second counter motion member piece 7", i.e. the piece(s) of the counter motion member which produce the counter motion force are shape memory alloy arrangement(s). An end portion 12' of the first counter motion member piece 7' and an end portion 12" of the second counter motion member piece 7" are attached to the non-moving part 6. Another end portion 13' of first counter motion member piece 7' and another end portion 13" of the second counter motion member piece 7" are connected to one another and to the movable phase shifter linkage 4. In an alternative configuration, the counter motion member 7 are not formed by the further shape memory alloy arrangement pieces 7', 7" but by mechanical springs.

The end portions 11', 11" of the shape memory alloy arrangement pieces 5', 5" and the end potions 13', 13" of the counter motion member pieces 7', 7" are connected to the movable phase shifter linkage 4 via the movable piston 8.

The remote electrical tilt drive 2 further comprises at least one end stop 24 configured to limit a stroke of the movable phase shifter linkage 4. The figure shows end stops 24 for both the predetermined direction and the direction opposite to the predetermined direction.

In the following, a controller 25 as part of the remote electrical tilt drive 2 will be described. Although this controller will be described in conjunction with the implementation of the remote electrical tilt drive 2 as shown in FIG. 8, the controller can analogously also be applied to all other implementations of the remote electrical tilt drive 2 as presented herein.

The remote electrical tilt drive 2 may comprise a controller 25. The controller 25 is configured to receive a tilt adjust signal 26 and to apply a current to the shape memory arrangement 5 so that the shape memory arrangement 5 moves the phase shifter linkage 4 into a predetermined position in dependence on the tilt adjust signal 26.

The controller 25 is connected to the shape memory alloy arrangement 5 and to the counter motion member 7 if configured as a further shape memory alloy arrangement and eventually also to an optional locking device 9 (FIG. 2). For receiving tilt adjust signals 26, the controller 25 can be further connected to another controller (not shown) of the antenna 1.

The controller 25 is optionally configured to determine a present position of the movable phase shifter linkage 4 based on an electrical resistance of the shape memory alloy arrangement 5. Furthermore, the controller 25 is optionally configured to determine a present temperature in the antenna 1 based on an electrical resistance of the shape memory alloy arrangement 5.

The remote electrical tilt drive 2 further optionally comprises a step indexing mechanism for working as a step indexing actuator. Then, arbitrary stroke lengths of the movable phase shifter linkage 4 are possible by multiple small pre-defined single strokes of the shape memory alloy arrangement 5. This can achieve a more compact design.

In use, when the shape memory alloy arrangement 5 is activated by being supplied with electrical current or heat, it moves the movable phase shifter linkage 4 (e.g. via the piston 8) in the predetermined direction to a new position and, thereby, it deforms the counter motion member 7. Once, the shape memory alloy of the shape memory alloy arrangement cools down, the piston 8 and, therefore, the movable phase shifter linkage 4, does not move back to the old position due to the behavior of the shape memory alloy arrangement 5. To move back to a direction opposite to the predetermined direction, in the case when the further shape memory alloy arrangement is provided as the counter motion member 7, the further shape memory alloy arrangement is activated by being supplied with electrical current or heat. In the case when the mechanical spring is provided as the counter motion member 7, the locking device 9 can be released and the movable phase shifter linkage 4 moves back due to a force of the mechanical spring.

Although the present invention has been described with reference to specific features and embodiments thereof, it is evident that various modifications and combinations can be made thereto without departing from the spirit and scope of the disclosure. The specification and drawings are, accordingly, to be regarded simply as an illustration of embodiments of the invention as defined by the appended claims, and are contemplated to cover any and all modifications, variations combinations or equivalents that fall within the scope of the present disclosure.

What is claimed is:

1. An antenna comprising a remote electrical tilt drive for driving a movable phase shifter linkage, the remote electrical tilt drive comprising:
    a shape memory alloy arrangement attached to a non-moving part of the antenna and to the movable phase shifter linkage, the shape memory alloy arrangement configured to move the movable phase shifter linkage in a predetermined direction upon energy being supplied to the shape memory alloy arrangement, and
    a counter motion member attached to the non-moving part of the antenna and to the movable phase shifter linkage and configured to move the movable phase shifter linkage in a direction opposite to the predetermined direction.

2. The antenna according to claim 1, wherein:
    the shape memory alloy arrangement comprises a first end portion and a second end portion, wherein the first end portion is attached to the non-moving part of the antenna and the second end portion is attached to the movable phase shifter linkage.

3. The antenna according to claim 2, further comprising:
    a fixed return support fixed to the non-moving part of the antenna, the fixed return support configured to redirect a portion of the shape memory alloy arrangement.

4. The antenna according to claim 2, further comprising:
    a flexible electric connector connected to the second end portion of the shape memory alloy arrangement attached to the movable phase shifter linkage, wherein the flexible electric connector is configured to supply the energy to the shape memory alloy arrangement in a form of an electrical current.

5. The antenna according to claim 1, wherein:
    the shape memory alloy arrangement comprises a first end portion, a second end portion, and an engagement section arranged between the first end portion and the second end portion,
    wherein both the first and second end portions are fixed to the non-moving part, and the engagement section is attached to the movable phase shifter linkage.

6. The antenna according to claim 5, further comprising:
    a movable return support fixed to the movable phase shifter linkage, wherein the movable return support is configured to redirect a portion of the shape memory alloy arrangement and to connect the engagement section of the shape memory alloy arrangement to the movable phase shifter linkage.

7. The antenna according to claim 1, wherein the shape memory alloy arrangement is formed by a single shape memory alloy piece.

8. The antenna according to claim 1, wherein:
    the shape memory alloy arrangement comprises two shape memory alloy arrangement pieces comprising a first shape memory alloy arrangement piece and a second shape memory alloy arrangement piece, wherein each memory alloy arrangement piece in the two shape memory alloy arrangement pieces comprises a first end portion and a second end portion;
    the first end portion of the first shape memory alloy arrangement piece and the first end portion of the second shape memory alloy arrangement piece are attached to the non-moving part; and
    the second end portion of the first shape memory alloy arrangement piece and the second end portion of the second shape memory alloy arrangement piece are connected to each other and to the movable phase shifter linkage.

9. The antenna according to claim 1, wherein:
    the counter motion member comprises a first end portion and a second end portion, wherein the first end portion of the counter motion member is attached to the non-moving part of the antenna and the second end portion of the counter motion member is attached to the movable phase shifter linkage.

10. The antenna according to claim 9, further comprising:
    a fixed return support fixed to the non-moving part of the antenna, the fixed return support configured to redirect a portion of the counter motion member.

11. The antenna according to claim 1, wherein:
the counter motion member comprises two end portions and an engagement section located between the two end portions,
wherein the two end portions of the counter motion member are fixed to the non-moving part, and
wherein the engagement section of the counter motion member is attached to the movable phase shifter linkage.

12. The antenna according to claim 11, further comprising:
a movable return support fixed to the movable phase shifter linkage, wherein the further movable return support is configured to redirect a portion of the counter motion member to connect the engagement section of the counter motion member to the movable phase shifter linkage.

13. The antenna according to claim 1, wherein:
the counter motion member comprises two counter motion member pieces comprising a first counter motion member piece and a second counter motion member piece, wherein each counter motion member piece in the two counter motion member pieces comprises a first end portion and a second end portion;
the first end portion of the first counter motion member piece and the first end portion of the second counter motion member piece are attached to the non-moving part; and
the second end portion of first counter motion member piece and the second end portion of the second counter motion member piece are connected to each other and to the movable phase shifter linkage.

14. The antenna according to claim 1, wherein the counter motion member comprises a mechanical spring.

15. The antenna according to claim 1, wherein:
the counter motion member is a further shape memory alloy arrangement, being configured to move the movable phase shifter linkage in an opposite direction to the predetermined direction upon energy being supplied to the further shape memory alloy arrangement.

16. The antenna according to claim 1, wherein at least a portion of the shape memory alloy arrangement has a shape of a coil spring.

17. The antenna according to claim 1, wherein:
the remote electrical tilt drive further comprises a locking device configured to lock the movable phase shifter linkage.

18. The antenna according to claim 1, further comprising:
a positioning sensor configured to detect a position of the movable phase shifter linkage.

19. The antenna according to claim 1, wherein the remote electrical tilt drive further comprises:
a controller configured to receive a tilt adjust signal and supply energy to the shape memory arrangement for moving the phase shifter linkage into a predetermined position based on the tilt adjust signal.

20. The antenna according to claim 19, wherein the controller is further configured to determine a present position of the movable phase shifter linkage based on an electrical resistance of the shape memory alloy arrangement.

21. The antenna according to claim 19, wherein the controller is further configured to determine a present temperature in the antenna based on an electrical resistance of the shape memory alloy arrangement.

* * * * *